(12) United States Patent
Guo et al.

(10) Patent No.: US 7,991,236 B2
(45) Date of Patent: Aug. 2, 2011

(54) DISCARDABLE LOWER LAYER ADAPTATIONS IN SCALABLE VIDEO CODING

(75) Inventors: Yi Guo, Anhui (CN); Ye-Kui Wang, Tampere (FI); Miska Hannuksela, Ruutana (FI); Houqiang Li, Hefei (CN)

(73) Assignee: Nokia Corporation, Espoo (FI)

( * ) Notice: Subject to any disclaimer, the term of this patent is extended or adjusted under 35 U.S.C. 154(b) by 959 days.

(21) Appl. No.: 11/872,683

(22) Filed: Oct. 15, 2007

(65) Prior Publication Data

US 2008/0089597 A1    Apr. 17, 2008

Related U.S. Application Data

(60) Provisional application No. 60/851,938, filed on Oct. 16, 2006.

(51) Int. Cl.
*G06K 9/36* (2006.01)
*G06K 9/42* (2006.01)
*G06K 9/46* (2006.01)

(52) U.S. Cl. ........................................ 382/238; 382/256

(58) Field of Classification Search .................. 382/232, 382/233, 238, 240, 254, 256, 260–264; 375/240.03, 375/240.08, 240.12, 240.13, 240.2, 240.24–240.26; 341/50
See application file for complete search history.

(56) References Cited

U.S. PATENT DOCUMENTS

| | | | |
|---|---|---|---|
| 6,720,893 B2 * | 4/2004 | Greenfield et al. | 341/50 |
| 6,792,047 B1 * | 9/2004 | Bixby et al. | 375/240.26 |
| 6,891,893 B2 * | 5/2005 | Sullivan et al. | 375/240.25 |
| 7,230,986 B2 * | 6/2007 | Wise et al. | 375/240.26 |
| 7,649,943 B2 * | 1/2010 | Speed et al. | 375/240.16 |
| 2005/0195900 A1 | 9/2005 | Han | |
| 2005/0259748 A1 * | 11/2005 | Payson et al. | 375/240.25 |
| 2006/0120448 A1 | 6/2006 | Han et al. | |
| 2006/0133484 A1 | 6/2006 | Park et al. | |
| 2007/0121723 A1 | 5/2007 | Mathew et al. | |
| 2007/0223580 A1 * | 9/2007 | Ye et al. | 375/240.12 |
| 2008/0089597 A1 * | 4/2008 | Guo et al. | 382/238 |
| 2009/0067507 A1 * | 3/2009 | Baird et al. | 375/240.24 |

FOREIGN PATENT DOCUMENTS

| | | |
|---|---|---|
| RU | 2189120 C2 | 9/2002 |
| RU | 2294058 C2 | 2/2007 |
| WO | WO 2006/006778 A1 | 1/2006 |
| WO | WO 2006/059847 | 6/2006 |
| WO | WO 2006/059847 A1 | 6/2006 |
| WO | WO 2007/064082 | 6/2007 |

OTHER PUBLICATIONS

International Search Report for PCT Application PCT/IB2007/054201.

(Continued)

*Primary Examiner* — Amir Alavi
(74) *Attorney, Agent, or Firm* — AlbertDhand, LLP

(57) ABSTRACT

A system and method for improving both coding efficiency and decoding accuracy in scalable video coding involving discardable lower layer adaptations, where applications can omit transmission of unused data for inter-layer prediction for all layers below an operation point of receivers. Indicator flags are utilized to avoid transmitting syntax elements that must be set to fixed values. In addition, padding algorithms or additional encoding constraints are applied to the encoding process.

9 Claims, 3 Drawing Sheets

OTHER PUBLICATIONS

Allowance of corresponding Russian 2009117291 dated Aug. 2, 2010, and English translation thereof.

Wang, Xianglin, et al. "Low Complexity Low Delay FGS Coding with Adaptive Reference". Picture Coding Symposium 2007, Nov. 7-9, 2007.

E. Francois and J. Vieron, "Extended Spatial Scalability: A Generalization of Spatial Scalability for Non Dyadic Configurations." IEEE International Conference on Image Processing, Oct. 8-11, 2006.

Russian Language reference, pp. 188-206.

* cited by examiner

DISCARDABLE LOWER LAYER ADAPTATIONS IN SCALABLE VIDEO CODING

This application claims benefit of 60/851,938 filed on 16 Oct. 2006.

FIELD OF THE INVENTION

The present invention relates generally to the field of scalable video coding. More particularly, the present invention relates to discardable lower layer adaptations in scalable video coding.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

There are a number of video coding standards including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 or ISO/IEC MPEG-4 AVC. H.264/AVC is the work output of a Joint Video Team (JVT) of ITU-T Video Coding Experts Group (VCEG) and ISO/IEC MPEG. There are also proprietary solutions for video coding (e.g. VC-1, also known as SMPTE standard 421M, based on Microsoft's Windows Media Video version 9), as well as national standardization initiatives, for example AVS codec by Audio and Video Coding Standard Workgroup in China. Some of these standards already specify a scalable extension, e.g. MPEG-2 visual and MPEG-4 visual. For H.264/AVC, the scalable video coding extension SVC, sometimes also referred to as SVC standard, is currently under development.

The latest draft of the SVC is described in JVT-T201, "Joint Draft 7 of SVC Amendment," 20th JVT Meeting, Klagenfurt, Austria, July 2006, available from http://ftp3.itu.ch/av-arch/jvt-site/2006_07_Klagenfurt/JVT-T201.zip.

SVC can provide scalable video bitstreams. A portion of a scalable video bitstream can be extracted and decoded with a degraded playback visual quality. A scalable video bitstream contains a non-scalable base layer and one or more enhancement layers. An enhancement layer may enhance the temporal resolution (i.e. the frame rate), the spatial resolution, or simply the quality of the video content represented by the lower layer or part thereof. In some cases, data of an enhancement layer can be truncated after a certain location, even at arbitrary positions, and each truncation position can include some additional data representing increasingly enhanced visual quality. Such scalability is referred to as fine-grained (granularity) scalability (FGS). In contrast to FGS, the scalability provided by a quality enhancement layer that does not provide fined-grained scalability is referred as coarse-grained scalability (CGS). Base layers can be designed to be FGS scalable as well.

The mechanism for providing temporal scalability in the latest SVC specification is referred to as the "hierarchical B pictures" coding structure. This feature is fully supported by Advanced Video Coding (AVC), and the signaling portion can be performed by using sub-sequence-related supplemental enhancement information (SEI) messages.

The mechanism for providing temporal scalability in the latest SVC specification is referred to as the "hierarchical B pictures" coding structure. This feature is fully supported by AVC, and the signaling portion can be performed by using sub-sequence-related supplemental enhancement information (SEI) messages.

For mechanisms to provide spatial and CGS scalabilities, a conventional layered coding technique similar to that used in earlier standards is used with some new inter-layer prediction methods. Data that could be inter-layer predicted includes intra texture, motion and residual data. Single-loop decoding is enabled by a constrained intra texture prediction mode, whereby the inter-layer intra texture prediction can be applied to macroblocks (MBs) for which the corresponding block of the base layer is located inside intra MBs. At the same time, those intra MBs in the base layer use constrained intra prediction. In single-loop decoding, the decoder needs to perform motion compensation and full picture reconstruction only for the scalable layer desired for playback (called the desired layer). For this reason, the decoding complexity is greatly reduced. All of the layers other than the desired layer do not need to be fully decoded because all or part of the data of the MBs not used for inter-layer prediction (be it inter-layer intra texture prediction, inter-layer motion prediction or inter-layer residual prediction) are not needed for reconstruction of the desired layer.

The spatial scalability has been generalized to enable the base layer to be a cropped and zoomed version of the enhancement layer. The quantization and entropy coding modules were adjusted to provide FGS capability. The coding mode is referred to as progressive refinement, wherein successive refinements of the transform coefficients are encoded by repeatedly decreasing the quantization step size and applying a "cyclical" entropy coding akin to sub-bitplane coding.

The scalable layer structure in the current draft SVC standard is characterized by three variables, referred to as temporal_level, dependency_id and quality_level, that are signaled in the bit stream or can be derived according to the specification. temporal_level is used to indicate the temporal layer hierarchy or frame rate. A layer comprising pictures of a smaller temporal_level value has a smaller frame rate than a layer comprising pictures of a larger temporal_level. dependency_id is used to indicate the inter-layer coding dependency hierarchy. At any temporal location, a picture of a smaller dependency_id value may be used for inter-layer prediction for coding of a picture with a larger dependency_id value. quality_level is used to indicate FGS layer hierarchy. At any temporal location and with identical dependency_id value, an FGS picture with quality_level value equal to QL uses the FGS picture or base quality picture (i.e., the non-FGS picture when QL-1=0) with quality_level value equal to QL-1 for inter-layer prediction.

In single-loop decoding of scalable video including at least two CGS or spatial scalable layers, only a portion of a coded picture in a lower layer is used for prediction of the corresponding coded picture in a higher layer (i.e. for inter-layer prediction). Therefore, if a sender knows the scalable layer desired for playback in the receivers, the bitrate used for transmission could be reduced by omitting those portions that are not used for inter-layer prediction and not in any of the scalable layers desired for playback. It should be noted that, in the case of a multicast or broadcast, where different clients may desire different layers for playback, these layers are called desired layers.

The Joint Video Team (JVT) is currently working on the development of the SVC standard. The JVT-R050r1 ("Discardable bits and Multi-layer RD estimation for Single loop decoding," 18th Meeting: Bangkok, Thailand, 14-20 Jan., 2006, available from http://ftp3.itu.ch/av-arch/jvt-site/2006_01_Bangkok/JVT-R050.zip) and JVT-R064 ("Selective Inter-layer Prediction," 18th Meeting: Bangkok, Thailand, 14-20 Jan., 2006, available from http://ftp3.itu.ch/av-arch/jvt-site/2006_01_Bangkok/JVT-R064.zip) contributions previously attempted to utilize "unneeded data" to improve the performance of SVC in certain application scenarios. JVT-R150r1 briefly proposed that discardable residuals be coded in a separate Network Abstraction Layer (NAL) unit or slice with the NAL discardable_flag set, where the discardable_flag indicated that a NAL unit is not required for decoding upper layers. However, only residual data is mentioned and it was not specified how to encode those "discardable" residuals to a separate NAL unit or slice. According to the current SVC design, this is impossible unless those MBs having residual data not required for inter-layer prediction are consecutive in raster scan order, which is not likely. JVT-R064 proposed to force all of the MBs to not be used for inter-layer prediction for a set of pictures (i.e., each coded as one slice) in certain layers of high temporal levels. A frame-based selective inter-layer prediction method has been proposed in JVT-S051 ("Frame Based Selective Inter-layer Prediction," 19th Meeting: Geneva, CH, 31 Mar.-7 Apr., 2006, available from http://ftp3.itu.ch/av-arch/jvt-site/2006_04_Geneva/JVT-S051.zip), wherein for certain pictures (each coded as one slice), all the MBs in of the pictures are forced not to be used for inter-layer prediction. The selection of the certain pictures is modeled as a knapsack problem and solved using dynamic programming. U.S. Provisional Patent Application 60/786,496 to Applicant and JVT-S039 ("On discardable lower layer adaptations," 19th Meeting: Geneva, CH, 31 Mar.-7 Apr., 2006, available from http://ftp3.itu.ch/av-arch/jvt-site/2006_04_Geneva/JVT-S039.zip), hereinafter incorporated in their entirety, proposed using slice groups and/or data partitioning to separate data needed for inter-layer prediction (non-discardable data) and data not needed for inter-layer prediction (discardable data), such that the discaradable data can be discarded to avoid unnecessary transmission and/or decoding.

In SVC, if spatial scalability is provided, a high layer MB can exploit inter-layer prediction using scaled base layer motion data when either a base mode_flag or a base_mode_refinement_flag is equal to 1. In this scenario, a high layer MB is reconstructed with default motion data deduced from the base layer. For example, if a base layer is of QCIF size and an enhancement layer is of CIF size, the motion vector of one block in the base layer will be scaled by 2 and upsampled to 2×2 motion vectors for the four co-located blocks in the enhancement layer.

For inter-layer texture prediction, if spatial resolution between the enhancement and base layers pictures is different, an interpolation filter is needed to upsample the base layer. Before applying the interpolation filter, the intra MBs of the base layer are extended by a 4-sample border in each direction using a border extension process. Before performing the border extension, a deblocking filter is applied to all boundaries inside an intra MB or between the intra MBs.

In inter-layer residual prediction of SVC, if a previous layer represents a layer with half the spatial resolution of the current layer, the residual signal is upsampled using a separable bi-linear filter before it is used as prediction signal. For inter-layer spatial resolution ratios different from 1 and 2, the interpolation process is based on a quarter-pel interpolation process as specified in AVC.

Assuming two layers exist, i.e., a lower layer and a higher layer, in current SVC, it is possible to mark a coded slice NAL unit in the low layer as discardable and that the discardable slice need not be present when decoding the higher layer. Therefore, the higher layer decoding must not depend on any data conveyed in the discardable slice, even if the discardable slice is present. This requirement can be met when each picture is coded as one slice, where the base_id_plus 1 of the higher layer slice/picture above a discardable lower layer slice/picture is set to 0. However, when a lower layer picture is coded into more than one slice and some of the slices are discardable while others not, problems arise in ensuring that the above requirement is met:

A first problem arises when a slice in a high layer picture covers regions covered by both discardable and non-discardable slices in the low layer. For each of the MBs covering regions covered by discardable slices in the lower layer, all the instances of syntax elements base_mode_flag, base_mode_refinement_flag, intra_base_flag, motion prediction flag_l0[ ], motion prediction flag_l1[ ],and residual_prediction_flag must be set to equal to 0. However, these syntax elements are still transmitted in the bitstream which results in reduced coding efficiency as compared to a case when these syntax elements are not transmitted for the MBs.

A second problem arises when the higher layer is a spatial scalable layer. The decoding process involves upsampling processes for samples or residual values to lower layer pictures before those values are used for inter-layer prediction. However, the upsampling result may become unpredictable for those MBs neighboring the discardable MBs due to the non-initialized values of the discardable MBs. Consequently, it is difficult to ensure that the decoding result is correct.

SUMMARY OF THE INVENTION

The present invention provides a system and method for enabling a coded slice in a coded picture consisting of more than one coded slice to be coded as discardable to higher layers (i.e., not required for the decoding of high layers) in an efficient manner. First, transmitting syntax elements that must be set to fixed values is avoided, thus improving coding efficiency. In particular, various flags can be added to the slice header in scalable extension and/or to the various MB syntax tables, so that transmitting certain syntax elements in variable MB syntax tables can be avoided. Second, interference from possibly discarded data in the upsampling process of sample or residual data used for inter-layer prediction is avoided as well, thus allowing for the correct decoding of higher layers. In particular, sample or residual values of discardable slices during both the encoding and decoding process are padded regardless of whether or not the discardable slices are available. Alternatively, constraints can be applied to the encoding process, such that the sample or residual values of the discardable slices in the low layer pictures are not used in the upsampling processes.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention provides a system and method for enabling a coded slice in a coded picture consisting of more than one coded slice to be coded as discardable to higher layers (i.e., not required for the decoding of high layers) in an efficient manner. First, transmitting syntax elements that must be set to fixed values is avoided, thus improving coding efficiency. Second, interference from possibly discarded data in the upsampling process of sample or residual data used for inter-layer prediction is avoided as well, thus allowing for the correct decoding of higher layers.

The present invention includes a video encoder (and encoding method) for separating data needed for inter-layer prediction and not needed for inter-layer prediction. In addition, the present invention also includes a video decoder (and decoding method) identifying data not needed for inter-layer prediction and not in the desired layer for playback, as well as omitting the decoding of such identified data, and decoding the desired layer for playback without the discardable data.

Figure 1:
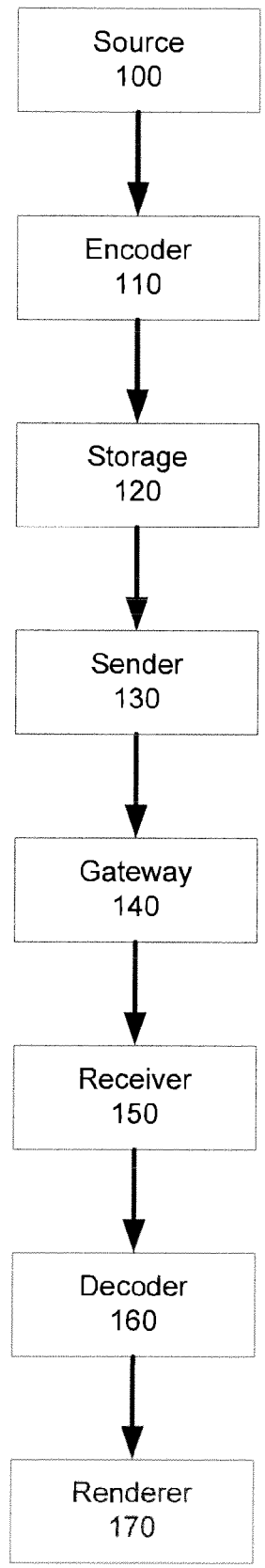
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to a sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and the sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. Finally, a renderer 170 may reproduce the uncompressed media streams with a loudspeaker or a display, for example. The receiver 150, the decoder 160, and the renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
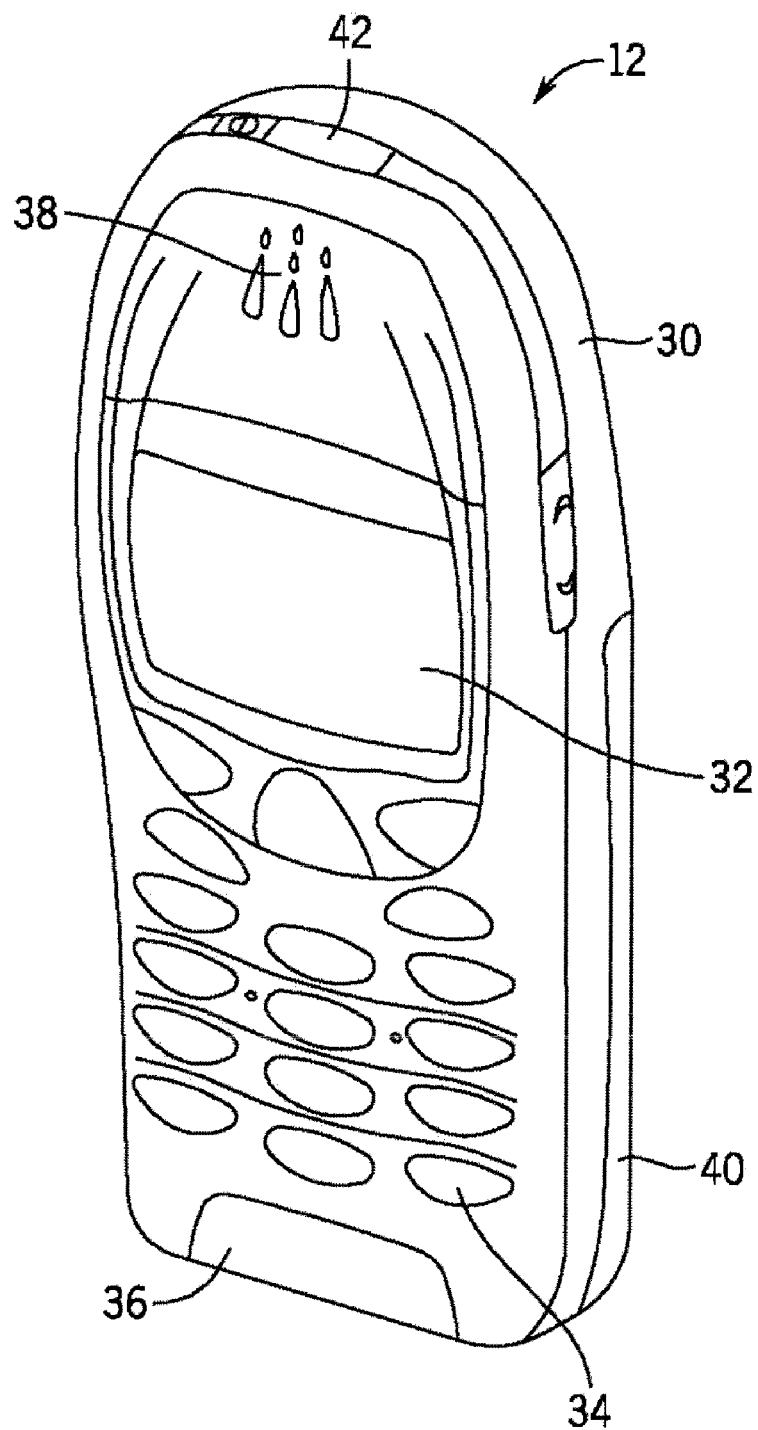
FIG. 2 is a perspective view of a mobile telephone that can be used in the implementation of the present invention.
Figure 3:
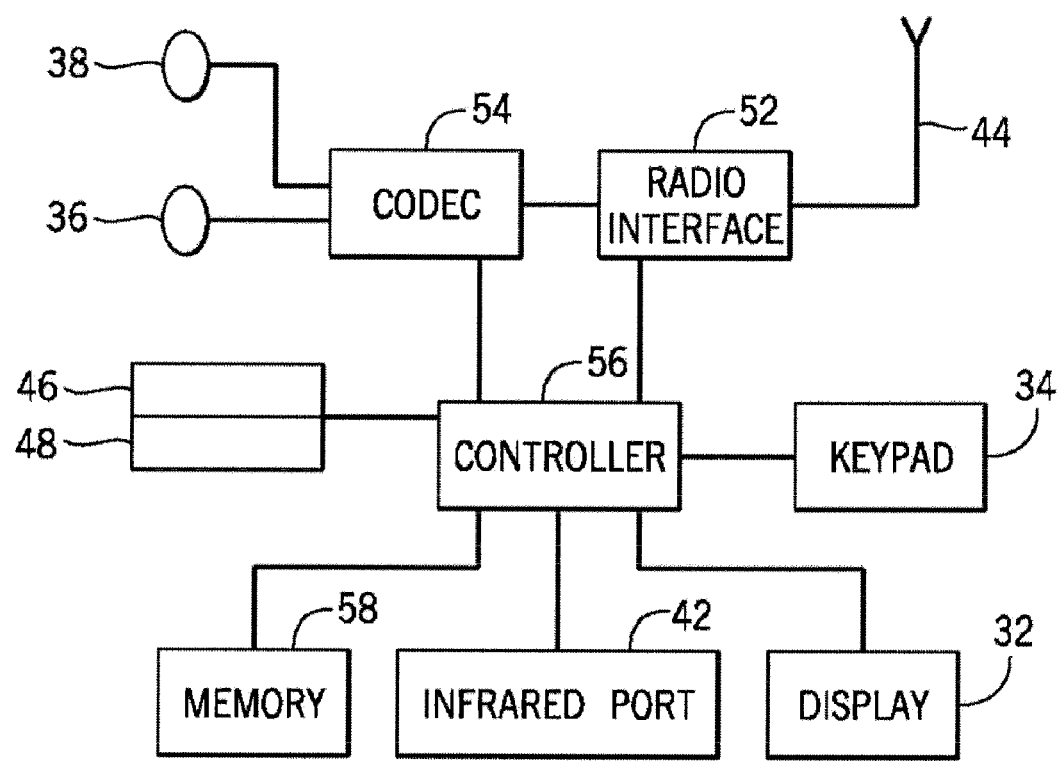
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. Some or all of the features depicted in FIGS. 2 and 3 could be incorporated into any or all of the devices represented in FIG. 1.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The implementation of the present invention according to various embodiments is based upon the SVC standard and progressive coding. However, it should be noted that the present invention is also applicable to other scalable coding methods, as well as interlace coding.

Considering, for example, the existence of two layers, i.e., a low layer and a high layer, MBs of the low layer can be categorized into one of the following two types:

1. Data from the MB is needed for inter-layer prediction (Type A).
2. No data from the MB is needed for inter-layer prediction (Type B). Type B MBs in one picture are coded in one or more slices with a syntax element discardable_flag being set to 1. Such type B MBs can be discarded if desirable.

When addressing the first problem described above, in terms of encoding, the base_discardable_flag present flag is added to the slice header in scalable extension for indicating whether the base_discardable_flag is present in the MB syntax table macroblock_layer in scalable_extension( ). The base_discardable_flag is added to the MB syntax table macroblock_layer in_scalable_extension( ), indicating whether the base slice covering the same region in the base layer picture indicated by base_id_plus1 is discardable when the base_discardable_flag is equal to 1. When the based_discardable_flag is equal to 0, the base_discardable_flag is not added to the MB syntax table macroblock_layer in_scalable_extension( ). Therefore, the following syntax of slice header in scalable extension is applicable:

| slice_header_in_scalable_extension( ) { | C | Descriptor |
|---|---|---|
|   first_mb_in_slice | 2 | ue(v) |
|   slice_type | 2 | ue(v) |
|   if( slice_type == PR ) { | | |
|     fragmented flag | 2 | u(1) |
|     if( fragmented_flag == 1 ) { | | |
|       fragment_order | 2 | ue(v) |
|       if ( fragment_order != 0) | | |
|         last_fragment_flag | 2 | u(1) |
|     } | | |
|     if( fragment_order == 0 ) { | | |
|       num_mbs_in_slice_minus1 | 2 | ue(v) |
|       luma_chroma_sep_flag | 2 | u(1) |
|     } | | |
|   } | | |
|   if( slice_type != PR || fragment_order == 0 ) { | | |
|     pic_parameter_set_id | 2 | ue(v) |
|     frame_num | 2 | u(v) |
|     if( !frame_mbs_only_flag ) { | | |
|       field_pic_flag | 2 | u(1) |
|       if( field_pic_flag ) | | |
|         bottom_field_flag | 2 | u(1) |
|     } | | |
|     if( nal_unit_type == 21 ) | | |
|       idr_pic_id | 2 | ue(v) |
|     if( pic_order_cnt_type == 0 ) { | | |
|       pic_order_cnt_lsb | 2 | u(v) |
|       if( pic_order_present_flag && !field_pic_flag ) | | |
|         delta_pic_order_cnt_bottom | 2 | se(v) |
|     } | | |
|     if( pic_order_cnt_type == 1 && !delta_pic_order_always_zero_flag ) { | | |
|       delta_pic_order_cnt[ 0 ] | 2 | se(v) |
|       if( pic_order_present_flag && !field_pic_flag ) | | |
|         delta_pic_order_cnt[ 1 ] | 2 | se(v) |
|     } | | |
|   } | | |
|   if( nal_ref_idc != 0 ) | | |
|     key_pic_flag | 2 | u(1) |
|   if( slice_type != PR ) { | | |
|     if( redundant_pic_cnt_present_flag ) | | |
|       redundant_pic_cnt | 2 | ue(v) |
|     if( slice_type == EB ) | | |
|       direct_spatial_mv_pred_flag | 2 | u(1) |
|     base_id_plus1 | 2 | ue(v) |
|     if( base_id_plus1 != 0 ) { | | |
|       adaptive_prediction_flag | 2 | u(1) |
|       base_discardable_flag_present_flag | 2 | u(1) |
|     } | | |
|     if( slice_type == EP || slice_type == EB ) { | | |
|       num_ref_idx_active_override_flag | 2 | u(1) |
|       if( num_ref_idx_active_override_flag ) { | | |
|         num_ref_idx_l0_active_minus1 | 2 | ue(v) |
|         if( slice_type == EB ) | | |
|           num_ref_idx_l1_active_minus1 | 2 | ue(v) |
|       } | | |
|     } | | |

| slice_header_in_scalable_extension( ) { | C | Descriptor |
|---|---|---|
|     ref_pic_list_reordering( ) | 2 | |
|     if( ( weighted_pred_flag && slice_type == EP ) \|\| | | |
|         ( weighted_bipred_idc == 1 && slice_type == EB ) ) { | | |
|       if( adaptive_prediction_flag) | | |
|         base_pred_weight_table_flag | 2 | u(1) |
|       if( base_pred_weight_table_flag == 0 ) | | |
|         pred_weight_table( ) | | |
|     } | | |
|     if( nal_ref_idc != 0 ) { | | |
|       dec_ref_pic_marking( ) | 2 | |
|       if ( key_pic_flag && nal_unit_type != 21 ) | | |
|         dec_ref_pic_marking_base( ) | | |
|     } | | |
|     if( entropy_coding_mode_flag && slice_type != EI ) | | |
|       cabac_init_idc | 2 | ue(v) |
| } | | |
| if( slice_type != PR \|\| fragment_order == 0 ) { | | |
|   slice_qp_delta | 2 | se(v) |
|   if( deblocking_filter_control_present_flag ) { | | |
|     disable_deblocking_filter_idc | 2 | ue(v) |
|     if( disable_deblocking_filter_idc != 1 ) { | | |
|       slice_alpha_c0_offset_div2 | 2 | se(v) |
|       slice_beta_offset_div2 | 2 | se(v) |
|     } | | |
|   } | | |
| } | | |
| if( slice_type != PR ) | | |
|   if( num_slice_groups_minus1 > 0 && | | |
|     slice_group_map_type >= 3 && slice_group_map_type <= 5) | | |
|     slice_group_change_cycle | 2 | u(v) |
| if( slice_type != PR && extended_spatial_scalability > 0 ) { | | |
|   if ( chroma_format_idc > 0 ) { | | |
|     base_chroma_phase_x_plus1 | 2 | u(2) |
|     base_chroma_phase_y_plus1 | 2 | u(2) |
|   } | | |
|   if( extended_spatial_scalability == 2 ) { | | |
|     scaled_base_left_offset | 2 | se(v) |
|     scaled_base_top_offset | 2 | se(v) |
|     scaled_base_right_offset | 2 | se(v) |
|     scaled_base_bottom_offset | 2 | se(v) |
|   } | | |
| } | | |
| if( slice_type == PR && fragment_order == 0) { | | |
|   adaptive_ref_fgs_flag | 2 | u(1) |
|   if( adaptive_ref_fgs_flag ) { | | |
|     max_diff_ref_scale_for_zero_base_block | 2 | u(5) |
|     max_diff_ref_scale_for_zero_base_coeff | 2 | u(5) |
|     fgs_entropy_order_flag | 2 | u(1) |
|   } | | |
|   motion_refinement_flag | 2 | u(1) |
| } | | |
| SpatialScalabilityType = spatial_scalability_type( ) | | |
| } | | |

In addition, the syntax table of macroblock layer in scalable extension is as follows:

| macroblock_layer_in_scalable_extension( ) { | C | Descriptor |
|---|---|---|
|   if( in_crop_window( CurrMbAddr ) ) | | |
|     if(base_discardable_flag_present_flag) | | |
|       base_discardable_flag | 2 | u(1)\|ae(v) |
|     if(adaptive_prediction_flag && !base_discardable_flag) { | | |
|       base_mode_flag | 2 | u(1)\|ae(v) |
|       if( ! base_mode_flag && SpatialScalabilityType > 0 && | | |
|         ! intra_base_mb( CurrMbAddr ) ) | | |
|         base_mode_refinement_flag | 2 | u(1)\|ae(v) |
|     } | | |
|   } | | |
|   if( ! base_mode_flag && ! base_mode_refinement_flag ) { | | |
|     mb_type | 2 | ue(v)\|ae(v) |
|     if( mb_type == I_NxN && in_crop_window( CurrMbAddr ) && | | |
|       !base_discardable_flag&& intra_base_mb( CurrMbAddr ) ) | | |

-continued

| macroblock_layer_in_scalable_extension( ) { | C | Descriptor |
|---|---|---|
|     intra_base_flag | 2 | u(1)\|ae(v) |
| } | | |
| if( mb_type == I_PCM ) { | | |
|   while( !byte_aligned( ) ) | | |
|     pcm_alignment_zero_bit | 2 | f(1) |
|   for( i = 0; i < 256; i++ ) | | |
|     pcm_sample_luma[ i ] | 2 | u(v) |
|   for( i = 0; i < 2 * MbWidthC * MbHeightC; i++ ) | | |
|     pcm_sample_chroma[ i ] | 2 | u(v) |
| } else { | | |
|   NoSubMbPartSizeLessThan8x8Flag = 1 | | |
|   if( mb_type != I_NxN && | | |
|     MbPartPredMode( mb_type, 0 ) != Intra_16x16 && | | |
|     NumMbPart( mb_type ) == 4 ) { | | |
|     sub_mb_pred_in_scalable_extension( mb_type ) | 2 | |
|     for( mbPartIdx = 0; mbPartIdx < 4; mbPartIdx++ ) | | |
|       if( sub_mb_type[ mbPartIdx ] != B_Direct_8x8 ) { | | |
|         if( NumSubMbPart( sub_mb_type [ mbPartIdx ] ) > 1 ) | | |
|           NoSubMbPartSizeLessThan8x8Flag = 0 | | |
|       } else if( !direct_8x8_inference_flag ) | | |
|         NoSubMbPartSizeLessThan8x8Flag = 0 | | |
|   } else { | | |
|     if( transform_8x8_mode_flag && mb_type == I_NxN ) | | |
|       transform_size_8x8_flag | 2 | u(1)\|ae(v) |
|     mb_pred_in_scalable_extension( mb_type ) | 2 | |
|   } | | |
|   if( MbPartPredMode( mb_type, 0 ) != Intra_16x16 ) { | | |
|     coded_block_pattern | 2 | me(v)\|ae(v) |
|     if( CodedBlockPatternLuma > 0 && | | |
|       transform_8x8_mode_flag && mb_type != I_NxN && | | |
|       NoSubMbPartSizeLessThan8x8Flag && | | |
|       !( MbPartPredMode( mb_type, 0 ) == B_Direct_16x16 && | | |
|         !direct_8x8_inference_flag ) ) | | |
|       transform_size_8x8_flag | 2 | u(1)\|ae(v) |
|   } | | |
|   if( CodedBlockPatternLuma > 0 \|\| CodedfBlockPatternChroma > 0 \|\| | | |
|     MbPartPredMode( mb_type, 0 ) == Intra_16x16 ) { | | |
|     mb_qp_delta | 2 | se(v)\|ae(v) |
|     residual_in_scalable_extension( ) | 3\|4 | |
|   } | | |
| } | | |
| } | | |

The syntax of macroblock prediction in scalable extension 40 is as follows:

| mb_pred_in_scalable_extension( mb_type ) { | C | Descriptor |
|---|---|---|
| if( MbPartPredMode( mb_type, 0 ) == Intra_4x4 \|\| | | |
|   MbPartPredMode( mb_type, 0 ) == Intra_8x8 \|\| | | |
|   MbPartPredMode( mb_type, 0 ) == Intra_16x16 ) { | | |
|   if( MbPartPredMode( mb_type, 0 ) == Intra_4x4 ) | | |
|     for( luma4x4BlkIdx = 0; luma4x4BlKIdx < 16; luma4x4BlkIdx++ ) { | | |
|       prev_intra4x4_pred_mode_flag[ luma4x4BlkIdx ] | 2 | u(1)\|ae(v) |
|       if( !prev_intra4x4_pred_mode_flag[ luma4x4BlkIdx ] ) | | |
|         rem_intra4x4_pred_mode[ 4x4BlkIdx ] | 2 | u(3)\|ae(v) |
|     } | | |
|   if( MbPartPredMode( mb_type, 0 ) == Intra_8x8 ) | | |
|     for( luma8x8Blkidx = 0; luma8x8BlkIdx < 4; luma8x8BlkIdx++ ) { | | |
|       prev_intra8x8_pred_mode_flag[ luma8x8BlkIdx ] | 2 | u(1)\|ae(v) |
|       if( !prev_intra8x8_pred_mode_flag[ luma8x8BlkIdx ] ) | | |
|         rem_intra8x8_pred_mode[ luma8x8BlkIdx ] | 2 | u(3)\|ae(v) |
|     } | | |
|   if( chroma_format_idc != 0 ) | | |
|     intra_chroma_pred_mode | 2 | ue(v)\|ae(v) |
| } else if( MbPartPredMode( mb_type, 0 ) != Direct && | | |
|   MbPartPredMode( mb_type, 0 ) != Intra_Base && | | |
|   ! base_mode_flag ) { | | |
|   if( !base_mode_refinement_flag ) { | | |
|     if( base_id_plus1 != 0 && !base_discardable_flag ) { | | |
|       for( mbPartIdx = 0; mbPartIdx < NumMbPart( mb_type ); mbPartIdx++) | | |

| mb_pred_in_scalable_extension( mb_type ) { | C | Descriptor |
|---|---|---|
|     if( MbPartPredMode( mb_type, mbPartIdx ) != Pred_L1 && <br>       base_mb_part_pred_mode( mb_type, mbPartIdx ) != Pred_L1 ) | | |
|       motion_prediction_flag_l0[ mbPartIdx ] | 2 | u(1)\|ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 && <br>       base_mb_part_pred_mode( mb_type, mbPartIdx ) != Pred_L0 ) | | |
|       motion_prediction_flag_l1[ mbPartIdx ] | 2 | u(1)\|ae(v) |
|   } | | |
|     for( mbPartIdx = 0; mbPartIdx < NumMbPart( mb_type ); mbPartIdx++) | | |
|       if( ( num_ref_idx_l0_active_minus1 > 0 \|\| <br>       mb_field_decoding_flag ) && <br>       MbPartPredMode( mb_type, mbPartIdx ) != Pred_L1 && <br>       ! motion_prediction_flag_l0[ mbPartIdx ] ) | | |
|       ref_idx_l0[ mbPartIdx ] | 2 | te(v)\|ae(v) |
|     for( mbPartIdx = 0; mbPartIdx < NumMbPart( mb_type ); mbPartIdx++) | | |
|       if( ( num_ref_idx_l1_active_minus1 > 0 \|\| <br>       mb_field_decoding_flag ) && <br>       MbPartPredMode( mb_type, mbPartIdx ) != Pred_L0 && <br>       ! motion_prediction_flag_l1[ mbPartIdx ] ) | | |
|       ref_idx_l1[ mbPartIdx ] | 2 | te(v)\|ae(v) |
|     for( mbPartIdx = 0; mbPartIdx < NumMbPart( mb_type ); mbPartIdx++) | | |
|       if( MbPartPredMode ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v)\|ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v)\|ae(v) |
|   } else { /* base_mode_refinement_flag */ | | |
|     for( mbPartIdx = 0; mbPartIdx < NumMbPart( mb_type ); mbPartIdx++) | | |
|       if( MbPartPredMode ( mb_type, mbPartIdx ) != Pred_L1 ) | | |
|         for( compIdx = 0; compIdx < 2; compIdx++ ) | | |
|           mvd_ref_l0[ mbPartIdx ][ 0 ][ compIdx ] | 2 | se(v)\|ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 ) | | |
|         for( compIdx = 0; compIdx < 2; compIdx++ ) | | |
|           mvd_ref_l1[ mbPartIdx ][ 0 ][ compIdx ] | 2 | se(v)\|ae(v) |
|   } | | |
| } | | |

The syntax of sub-macroblock prediction in scalable extension is as follows:

| sub_mb_pred_in_scalable_extension( MbType ) { | C | Descriptor |
|---|---|---|
|   if( !base_mode_flag && !base_mode_refinement_flag ) { | | |
|     for( mbPartIdx = 0; mbPartIdx < 4; mbPartIdx++ ) | | |
|       sub_mb_type[ mbPartIdx ] | 2 | ue(v)\|ae(v) |
|     if( base_id_plus1 != 0 && !base_discardable_flag) { | | |
|       for( mbPartIdx = 0; mbPartIdx < 4; mbPartIdx++ ) | | |
|         if( SubMbPredMode( sub_mb_type[ mbPartIdx ] ) != Pred_L1 && <br>          base_mb_part_pred_mode( CurrMbAddr, mbPartIdx ) != Pred_L1 ) | | |
|           motion_prediction_flag_l0[ mbPartIdx ] | 2 | u(1)\|ae(v) |
|       for( mbPartIdx = 0; mbPartIdx < 4; mbPartIdx++ ) | | |
|         if( SubMbPredMode( sub_mb_type[ mbPartIdx ] ) != Pred_L0 && <br>          base_mb_part_pred_mode( CurrMbAddr, mbPartIdx ) != Pred_L0 ) | | |
|           motion_prediction_flag_l1[ mbPartIdx ] | 2 | u(1)\|ae(v) |
|     } | | |
|     for( mbPartIdx = 0; mbPartIdx < 4; mbPartIdx++ ) | | |
|       if( ( num_ref_idx_l0_active_minus1 > 0 \|\| mb_field_decoding_flag ) && <br>        sub_mb_type[ mbPartIdx ] != B_Direct_8x8 && <br>        SubMbPredMode( sub_mb_type[ mbPartIdx ] ) != Pred_L1 && <br>        !motion_prediction_flag_l0[ mbPartIdx ] ) | | |

-continued

| | C | Descriptor |
|---|---|---|
| sub_mb_pred_in_scalable_extension( MbType ) { | | |
|     ref_idx_l0[ mbPartIdx ] | 2 | te(v)\|ae(v) |
|   for( mbPartIdx = 0; mbPartIdx < 4; mbPartIdx++ ) | | |
|     if( ( num_ref_idx_l1_active_minus1 > 0 \|\| mb_field_decoding_flag ) && | | |
|       sub_mb_type[ mbPartIdx ] != B_Direct_8x8 && | | |
|       SubMbPredMode( sub_mb_type[ mbPartIdx ] ) != Pred_L0 && | | |
|       !motion_prediction_flag_l1[ mbPartIdx ] ) | | |
|         ref_idx_l1[ mbPartIdx ] | 2 | te(v)\|ae(v) |
|   for( mbPartIdx = 0; mbPartIdx < 4; mbPartIdx++ ) | | |
|     if( sub_mb_type[ mbPartIdx ] != B_Direct_8x8 && | | |
|       SubMbPredMode( sub_mb_type[ mbPartIdx ] ) != Pred_L1 ) | | |
|     for( subMbPartIdx = 0; | | |
|       subMbPartIdx < NumSubMbPart( sub_mb_type[ mbPartIdx ] ); | | |
|       subMbPartIdx++) | | |
|       for( compIdx = 0; compIdx < 2; compIdx++ ) | | |
|         mvd_l0[ mbPartIdx ][ subMbPartIdx ][ compIdx ] | 2 | se(v)\|ae(v) |
|   for( mbPartIdx = 0; mbPartIdx < 4; mbPartIdx++ ) | | |
|     if( sub_mb_type[ mbPartIdx ] != B_Direct_8x8 && | | |
|       SubMbPredMode( sub_mb_type[ mbPartIdx ] ) != Pred_L0 ) | | |
|     for( subMbPartIdx = 0; | | |
|       subMbPartIdx < NumSubMbPart( sub_mb_type[ mbPartIdx ] ); | | |
|       subMbPartIdx++) | | |
|       for( compIdx = 0; compIdx < 2; compIdx++ ) | | |
|         mvd_l1[ mbPartIdx ][ subMbPartIdx ][ compIdx ] | 2 | se(v)\|ae(v) |
| } else if( base_mode_refinement_flag ) { | | |
|   for( mbPartIdx = 0; mbPartIdx < 4; mbPartIdx++ ) | | |
|     if( SubMbPredMode( sub_mb_type[ mbPartIdx ] ) != Pred_L1 ) | | |
|     for( subMbPartIdx = 0; | | |
|       subMbPartIdx < NumSubMbPart( sub_mb_type[ mbPartIdx ] ); | | |
|       subMbPartIdx++) | | |
|       for( compIdx = 0; compIdx < 2; compIdx++ ) | | |
|         mvd_ref_l0[ mbPartIdx ][ subMbPartIdx ][ compIdx ] | 2 | se(v)\|ae(v) |
|   for( mbPartIdx = 0; mbPartIdx < 4; mbPartIdx++ ) | | |
|     if( SubMbPredMode( sub_mb_type[ mbPartIdx ] ) != Pred_L0 ) | | |
|     for( subMbPartIdx = 0; | | |
|       subMbPartIdx < NumSubMbPart( sub_mb_type[ mbPartIdx ] ); | | |
|       subMbPartIdx++) | | |
|       for( compIdx = 0; compIdx < 2; compIdx++ ) | | |
|         mvd_ref_l1[ mbPartIdx ][ subMbPartIdx ][ compIdx ] | 2 | se(v)\|ae(v) |
|   } | | |
| } | | |

The syntax of residual in scalable extension is as follows:

| | C | Descriptor |
|---|---|---|
| residual_in_scalable_extension( ) { | | |
|   if ( adaptive_prediction_flag && !base_discardable_flag && | | |
|     MbPartPredType( mb_type, 0 ) != Intra_16x16 && | | |
|     MbPartPredType( mb_type, 0 ) != Intra_8x8 && | | |
|     MbPartPredType( mb_type, 0 ) != Intra_4x4 && | | |
|     MbPartPredType( mb_type, 0 ) != Intra_Base ) { | | |
|     residual_prediction_flag | 3\|4 | u(1)\|ae(v) |
|     if ( residual_prediction_flag && base_mode_flag && | | |
|       constrained_inter_layer_pred( ) ) | | |
|       smoothed_reference_flag | 3\|4 | u(1)\|ae(v) |
|   } | | |
|   if( !entropy_coding_mode_flag ) | | |
|     residual_block = residual_block_cavlc | | |
|   else | | |
|     residual_block = residual_block_cabac | | |
|   if( MbPartPredMode( mb_type, 0 ) == Intra_16x16 ) | | |
|     residual_block_cabac( Intra16x16DCLevel, 16 ) | 3 | |
|   for( i8x8 = 0; i8x8 < 4; i8x8++ ) /* each luma 8x8 block */ | | |
|     if( !transform_size_8x8_flag ) | | |
|       for( i4x4 = 0; i4x4 < 4; i4x4++ ) { /* each 4x4 sub-block of block */ | | |
|         if( CodedBlockPatternLuma & ( 1 << i8x8 ) ) | | |
|           if( MbPartPredMode( mb_type, 0 ) == Intra_16x16 ) | | |
|             residual_block( Intra16x16ACLevel[i8x8 * 4 + i4x4], 15 ) | 3 | |
|           else | | |
|             residual_block( LumaLevel[ i8x8 * 4 + i4x4 ], 16 ) | 3\|4 | |
|         else if( MbPartPredMode( mb_type, 0 ) == Intra_16x16 ) | | |
|           for( i = 0; i < 15; i++ ) | | |
|             Intra16x16ACLevel[ i8x8 * 4 + i4x4 ][ i ] = 0 | | |

-continued

| residual_in_scalable_extension( ) { | C | Descriptor |
|---|---|---|
|     else | | |
|         for( i = 0; i < 16; i++ ) | | |
|             LumaLevel[ i8x8 * 4 + i4x4 ][ i ] = 0 | | |
|     } | | |
|     else if( CodedBlockPatternLuma & ( 1 << i8x8 ) ) | | |
|         residual_block( LumaLevel8x8[ i8x8 ], 64 ) | 3\|4 | |
|     else | | |
|         for( i = 0; i < 64; i++ ) | | |
|             LumaLevel8x8[ i8x8 ][ i ] = 0 | | |
| if( chroma_format_idc != 0 ) { | | |
|     NumC8x8 = 4 / ( SubWidthC * SubHeightC ) | | |
|     for( iCbCr = 0; iCbCr < 2; iCbCr++ ) | | |
|         if( CodedBlockPatternChroma & 3 ) /* chroma DC residual present */ | | |
|             residual_block( ChromaDCLevel[ iCbCr ], 4 * NumC8x8 ) | 3\|4 | |
|         else | | |
|             for( i = 0; i < 4 * NumC8x8; i++ ) | | |
|                 ChromaDCLevel[ iCbCr ][ i ] = 0 | | |
|     for( iCbCr = 0; iCbCr < 2; iCbCr++ ) | | |
|         for( i8x8 = 0; i8x8 < NumC8x8; i8x8++ ) | | |
|             for( i4x4 = 0; i4x4 < 4; i4x4++ ) | | |
|                 if( CodedBlockPatternChroma & 2 ) | | |
|                                  /* chroma AC residual present */ | | |
|                     residual_block( ChromaACLevel[ iCbCr ][ i8x8*4+i4x4 ], 15) | 3\|4 | |
|                 Else | | |
|                     for( i = 0; i < 15; i++ ) | | |
|                         ChromaACLevel[ iCbCr ][ i8x8*4+i4x4 ][ i ] = 0 | | |
| } | | |

An alternative to avoid having the base_discardable_flag in each MB is as follows. A pps_discardable_info_flag is added to the slice header in scalable extension, indicating whether the picture parameter set (PPS) used by its base layer picture indicated by base_id_plus1 contains slice group map information, where each of the slice groups corresponds to discardable or non-discardable slices. Slice group 0 can comprise non-discardableslices, while slice group 1 can comprise discardable slices. A variable, BaseDiscardableFlag, is derived according to the slice group information. If a current MB covers a base layer MB of a discardable slice, the BaseDiscardableFlag is set to equal 1. Otherwise, the BaseDiscardableFlag is set to equal 0. If there is only one slice group for each coded picture, then MB level or slice level mapping information can be signaled, e.g., in PPS, similar to the case when more than one slice group is in use. The variable BaseDiscardableFlag can then be specified similarly. The BaseDiscardableFlag variable can then be used to replace base_discardable_flag in the above MB syntax tables, and the signaling of base_discardable_flag can be removed.

When syntax changes for independent parsing in JVT-T079 ("Updated results for independent parsing of spatial and CGS layers," 20th JVT Meeting, Klagenfurt, Austria, July 2006, available from http://ftp3.itu.ch/av-arch/jvt-site/2006_07_Klagenfurt/JVT-T079.zip) are considered, the changed syntax tables to solve the first problem are as follows. It should be noted that the alternative process of using pps_discardable_info_flag and BaseDiscardableFlag is used. The syntax of slice header in scalable extension is as follows:

| slice_header_in_scalable_extension( ) { | C | Descriptor |
|---|---|---|
|     first_mb_in_slice | 2 | ue(v) |
|     slice_type | 2 | ue(v) |
|     if( slice_type == PR ) { | | |
|         fragmented_flag | 2 | u(1) |
|         if( fragmented_flag == 1 ) { | | |
|             fragment_order | 2 | ue(v) |
|             if ( fragment_order != 0) | | |
|                 last_fragment_flag | 2 | u(1) |
|         } | | |
|         if( fragment_order == 0 ) { | | |
|             num_mbs_in_slice_minus1 | 2 | ue(v) |
|             luma_chroma_sep_flag | 2 | u(1) |
|         } | | |
|     } | | |
|     if( slice_type != PR \|\| fragment_order == 0 ) { | | |
|         pic_parameter_set_id | 2 | ue(v) |
|         frame_num | 2 | u(v) |
|         if( !frame_mbs_only_flag ) { | | |
|             field_pic_flag | 2 | u(1) |
|             if( field_pic_flag ) | | |

-continued

| slice_header_in_scalable_extension( ) { | C | Descriptor |
|---|---|---|
|         bottom_field_flag | 2 | u(1) |
|     } | | |
|     if( nal_unit_type == 21 ) | | |
|       idr_pic_id | 2 | ue(v) |
|     if( pic_order_cnt_type == 0 ) { | | |
|       pic_order_cnt_lsb | 2 | u(v) |
|       if( pic_order_present_flag && !field_pic_flag ) | | |
|         delta_pic_order_cnt_bottom | 2 | se(v) |
|     } | | |
|     if( pic_order_cnt_type == 1 && !delta_pic_order_always_zero_flag ) { | | |
|       delta_pic_order_cnt[ 0 ] | 2 | se(v) |
|       if( pic_order_present_flag && !field_pic_flag ) | | |
|         delta_pic_order_cnt[ 1 ] | 2 | se(v) |
|     } | | |
| } | | |
| if( nal_ref_idc != 0 ) | | |
|   key_pic_flag | 2 | u(1) |
| if( slice_type != PR ) { | | |
|   if( redundant_pic_cnt_present_flag ) | | |
|     redundant_pic_cnt | 2 | ue(v) |
|   if( slice_type == EB ) | | |
|     direct_spatial_mv_pred_flag | 2 | u(1) |
|   base_id_plus1 | 2 | ue(v) |
|   if( base_id_plus1 != 0 ) { | | |
|     adaptive_prediction_flag | 2 | u(1) |
|     pps_discardable_info | 2 | u(1) |
|   } | | |
|   if( slice_type == EP || slice_type == EB ) { | | |
|     num_ref_idx_active_override_flag | 2 | u(1) |
|     if( num_ref_idx_active_override_flag ) { | | |
|       num_ref_idx_10_active_minus1 | 2 | ue(v) |
|       if( slice_type == EB ) | | |
|         num_ref_idx_11_active_minus1 | 2 | ue(v) |
|     } | | |
|   } | | |
|   ref_pic_list_reordering( ) | 2 | |
|   if( ( weighted_pred_flag && slice_type == EP ) || | | |
|     ( weighted_bipred_idc == 1 && slice_type == EB ) ) { | | |
|     if( adaptive_prediction_flag) | | |
|       base_pred_weight_table_flag | 2 | u(1) |
|     if( base_pred_weight_table_flag == 0 ) | | |
|       pred_weight_table( ) | | |
|   } | | |
|   if( nal_ref_idc != 0 ) { | | |
|     dec_ref_pic_marking( ) | 2 | |
|     if ( key_pic_flag && nal_unit_type != 21 ) | | |
|       dec_ref_pic_marking_base( ) | | |
|   } | | |
|   if( entropy_coding_mode_flag && slice_type != EI ) | | |
|     cabac_init_idc | 2 | ue(v) |
| } | | |
| if( slice_type != PR || fragment_order == 0 ) { | | |
|   slice_qp_delta | 2 | se(v) |
|   if( deblocking_filter_control_present_flag ) { | | |
|     disable_deblocking_filter_idc | 2 | ue(v) |
|     if( disable_deblocking_filter_idc != 1 ) { | | |
|       slice_alpha_c0_offset_div2 | 2 | se(v) |
|       slice_beta_offset_div2 | 2 | se(v) |
|     } | | |
|   } | | |
| } | | |
| if( slice_type != PR ) | | |
|   if( num_slice_groups_minus1 > 0 && | | |
|     slice_group_map_type >= 3 && slice_group_map_type <= 5) | | |
|     slice_group_change_cycle | 2 | u(v) |
| if( slice_type != PR && extended_spatial_scalability > 0 ) { | | |
|   if( chroma_format_idc > 0 ) { | | |
|     base_chroma_phase_x_plus1 | 2 | u(2) |
|     base_chroma_phase_y_plus1 | 2 | u(2) |
|   } | | |
|   if( extended_spatial_scalability == 2 ) { | | |
|     scaled_base_left_offset | 2 | se(v) |
|     scaled_base_top_offset | 2 | se(v) |
|     scaled_base_right_offset | 2 | se(v) |
|     scaled_base_bottom_offset | 2 | se(v) |
|   } | | |
| } | | |
| if( slice_type == PR && fragment_order == 0) { | | |

| slice_header_in_scalable_extension( ) { | C | Descriptor |
|---|---|---|
|    adaptive_ref_fgs_flag | 2 | u(1) |
|    if( adaptive_ref_fgs_flag ) { | | |
|      max_diff_ref_scale_for_zero_base_block | 2 | u(5) |
|      max_diff_ref_scale_for_zero_base_coeff | 2 | u(5) |
|      fgs_entropy_order_flag | 2 | u(1) |
|    } | | |
|    motion_refinement_flag | 2 | u(1) |
| } | | |
| SpatialScalabilityType = spatial_scalability_type( ) | | |
| } | | |

The macroblock layer in scalable extension syntax is as follows:

| macroblock_layer_in_scalable_extension( ) { | C | Descriptor |
|---|---|---|
|   if( in_crop_window( CurrMbAddr ) ) | | |
|     if(adaptive_prediction_flag && ! BaseDiscardableFlag) { | | |
|       base_mode_flag | 2 | u(1)\|ae(v) |
|     } | | |
|   } | | |
|   if( ! base_mode_flag ) { | | |
|     mb_type | 2 | ue(v)\|ae(v) |
|   } | | |
|   if( mb_type == I_PCM ) { | | |
|     while( !byte_aligned( ) ) | | |
|       pcm_alignment_zero_bit | 2 | f(1) |
|     for( i = 0; i < 256; i++ ) | | |
|       pcm_sample_luma[ i ] | 2 | u(v) |
|     for( i = 0; i < 2 * MbWidthC * MbHeightC; i++ ) | | |
|       pcm_sample_chroma[ i ] | 2 | u(v) |
|   } else { | | |
|   if( !base_mode_flag ) { | | |
|     NoSubMbPartSizeLessThan8x8Flag = 1 | | |
|     if( mb_type != I_NxN && | | |
|       MbPartPredMode( mb_type, 0 ) != Intra_16x16 && | | |
|       NumMbPart( mb_type ) == 4 ) { | | |
|       sub_mb_pred_in_scalable_extension( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type [ mbPartIdx ] ) > 1 ) | | |
|             NoSubMbPartSizeLessThan8x8Flag = 0 | | |
|         } else if( !direct_8x8_inference_flag ) | | |
|           NoSubMbPartSizeLessThan8x8Flag = 0 | | |
|     } else { | | |
|       if( transform_8x8_mode_flag && mb_type == I_NxN ) | | |
|         transform_size_8x8_flag | 2 | u(1)\|ae(v) |
|       mb_pred_in_scalable_extension( mb_type ) | 2 | |
|     } | | |
|   } | | |
|     if( MbPartPredMode( mb_type, 0 ) != Intra_16x16 ) { | | |
|       coded_block_pattern | 2 | me(v)\|ae(v) |
|       if( CodedBlockPatternLuma > 0 && | | |
|         transform_8x8_mode_flag && | | |
|          (base_mode_flag \|\| | | |
|          (mb_type != I_NxN && | | |
|         NoSubMbPartSizeLessThan8x8Flag && | | |
|         !( MbPartPredMode( mb_type, 0 ) == B_Direct_16x16 && | | |
|          !direct_8x8_inference_flag ))) ) | | |
|         transform_size_8x8_flag | 2 | u(1)\|ae(v) |
|     } | | |
|     if( CodedBlockPatternLuma > 0 \|\| CodedBlockPatternChroma > 0 \|\| | | |
|       MbPartPredMode( mb_type, 0 ) == Intra_16x16 ) { | | |
|       mb_qp_delta | 2 | se(v)\|ae(v) |
|       residual_in_scalable_extension( ) | 3\|4 | |
|     } | | |
|   } | | |
| } | | |

The macroblock prediction in scalable extension syntax is as follows:

| mb_pred_in_scalable_extension( mb_type ) { | C | Descriptor |
|---|---|---|
|   if( MbPartPredMode( mb_type, 0 ) == Intra_4x4 \|\| | | |
|     MbPartPredMode( mb_type, 0 ) == Intra_8x8 \|\| | | |
|     MbPartPredMode( mb_type, 0 ) == Intra_16x16 ) { | | |
|     if( MbPartPredMode( mb_type, 0 ) == Intra_4x4 ) | | |
|       for( luma4x4BlkIdx = 0; luma4x4BlkIdx < 16; luma4x4BlkIdx++ ) { | | |
|         prev_intra4x4_pred_mode_flag[ luma4x4BlkIdx ] | 2 | u(1)\|ae(v) |
|         if( !prev_intra4x4_pred_mode_flag[ luma4x4BlkIdx ] ) | | |
|           rem_intra4x4_pred_mode[ luma4x4BlkIdx ] | 2 | u(3)\|ae(v) |
|       } | | |
|     if( MbPartPredMode( mb_type, 0 ) == Intra_8x8 ) | | |
|       for( luma8x8BlkIdx = 0; luma8x8BlkIdx < 4; luma8x8BlkIdx++ ) { | | |
|         prev_intra8x8_pred_mode_flag[ luma8x8BlkIdx ] | 2 | u(1)\|ae(v) |
|         if( !prev_intra8x8_pred_mode_flag[ luma8x8BlkIdx ] ) | | |
|           rem_intra8x8_pred_mode[ luma8x8BlkIdx ] | 2 | u(3)\|ae(v) |
|       } | | |
|     if( chroma_format_idc != 0 ) | | |
|       intra_chroma_pred_mode | 2 | ue(v)\|ae(v) |
|   } else if( MbPartPredMode( mb_type, 0 ) != Direct ) { | | |
|     if( base_id_plus1 != 0 && ! BaseDiscardableFlag ) { | | |
|       for( mbPartIdx = 0; mbPartIdx < NumMbPart( mb_type ); mbPartIdx++) | | |
|         if( MbPartPredMode( mb_type, mbPartIdx ) != Pred_L1 ) | | |
|           motion_prediction_flag_l0[ mbPartIdx ] | 2 | u(1)\|ae(v) |
|       for( mbPartIdx = 0; mbPartIdx < NumMbPart( mb_type ); mbPartIdx++) | | |
|         if( MbPartPredMode( mb_type, mbPartIdx ) != Pred_L0 ) | | |
|           motion_prediction_flag_l1[ mbPartIdx ] | 2 | u(1)\|ae(v) |
|     } | | |
|     for( mbPartIdx = 0; mbPartIdx < NumMbPart( mb_type ); mbPartIdx++) | | |
|       if( ( num_ref_idx_l0_active_minus1 > 0 \|\| | | |
|         mb_field_decoding_flag ) && | | |
|         MbPartPredMode( mb_type, mbPartIdx ) != Pred_L1 && | | |
|         ! motion_prediction_flag_l0[ mbPartIdx ] ) | | |
|         ref_idx_l0[ mbPartIdx ] | 2 | te(v)\|ae(v) |
|     for( mbPartIdx = 0; mbPartIdx < NumMbPart( mb_type ); mbPartIdx++) | | |
|       if( ( num_ref_idx_l1_active_minus1 > 0 \|\| | | |
|         mb_field_decoding_flag ) && | | |
|         MbPartPredMode( mb_type, mbPartIdx ) != Pred_L0 && | | |
|         ! motion_prediction_flag_l1[ mbPartIdx ] ) | | |
|         ref_idx_l1[ mbPartIdx ] | 2 | te(v)\|ae(v) |
|     for( mbPartIdx = 0; mbPartIdx < NumMbPart( mb_type ); mbPartIdx++) | | |
|       if( MbPartPredMode ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v)\|ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v)\|ae(v) |
|   } | | |
| } | | |

The sub-macroblock prediction in scalable extension syntax is as follows:

| sub_mb_pred_in_scalable_extension( MbType ) { | C | Descriptor |
|---|---|---|
|   if( !base_mode_flag ) { | | |
|     for( mbPartIdx = 0; mbPartIdx < 4; mbPartIdx++ ) | | |
|       sub_mb_type[ mbPartIdx ] | 2 | ue(v)\|ae(v) |
|     if( base_id_plus1 != 0 && ! BaseDiscardableFlag) { | | |
|       for( mbPartIdx = 0; mbPartIdx < 4; mbPartIdx++ ) | | |
|         if( SubMbPredMode( sub_mb_type[ mbPartIdx ] ) != Pred_L1 ) | | |
|           motion_prediction_flag_l0[ mbPartIdx ] | 2 | u(1)\|ae(v) |
|       for( mbPartIdx = 0; mbPartIdx < 4; mbPartIdx++ ) | | |
|         if( SubMbPredMode( sub_mb_type[ mbPartIdx ] ) != Pred_L0) | | |

-continued

| sub_mb_pred_in_scalable_extension( MbType ) { | C | Descriptor |
|---|---|---|
|       motion_prediction_flag_l1[ mbPartIdx ]<br>  }<br>  for( mbPartIdx = 0; mbPartIdx < 4; mbPartIdx++ )<br>    if( ( num_ref_idx_l0_active_minus1 > 0 \|\| mb_field_decoding_flag ) &&<br>      sub_mb_type[ mbPartIdx ] != B_Direct_8x8 &&<br>      SubMbPredMode( sub_mb_type[ mbPartIdx ] ) != Pred_L1 &&<br>      !motion_prediction_flag_l0[ mbPartIdx ] )<br>      ref_idx_l0[ mbPartIdx ]<br>  for( mbPartIdx = 0; mbPartIdx < 4; mbPartIdx++ )<br>    if( (num_ref_idx_l1_active_minus1 > 0 \|\| mb_field_decoding_flag ) &&<br>      sub_mb_type[ mbPartIdx ] != B_Direct_8x8 &&<br>      SubMbPredMode( sub_mb_type[ mbPartIdx ] ) != Pred_L0 &&<br>      !motion_prediction_flag_l1[ mbPartIdx ] )<br>      ref_idx_l1[ mbPartIdx ]<br>  for( mbPartIdx = 0; mbPartIdx < 4; mbPartIdx++ )<br>    if( sub_mb_type[ mbPartIdx ] != B_Direct_8x8 &&<br>      SubMbPredMode( sub_mb_type[ mbPartIdx ] ) != Pred_L1 )<br>      for( subMbPartIdx = 0;<br>        subMbPartIdx < NumSubMbPart( sub_mb_type[ mbPartIdx ] );<br>        subMbPartIdx++)<br>        for( compIdx = 0; compIdx < 2; compIdx++ )<br>          mvd_l0[ mbPartIdx ][ subMbPartIdx ][ compIdx ]<br>  for( mbPartIdx = 0; mbPartIdx < 4; mbPartIdx++ )<br>    if( sub_mb_type[ mbPartIdx ] != B_Direct_8x8 &&<br>      SubMbPredMode( sub_mb_type[ mbPartIdx ] ) != Pred_L0 )<br>      for( subMbPartIdx = 0;<br>        subMbPartIdx < NumSubMbPart( sub_mb_type[ mbPartIdx ] );<br>        subMbPartIdx++)<br>        for( compIdx = 0; compIdx < 2; compIdx++ )<br>          mvd_l1[ mbPartIdx ][ subMbPartIdx ][ compIdx ]<br>}<br>} | 2<br><br><br><br><br><br>2<br><br><br><br><br><br>2<br><br><br><br><br><br><br>2<br><br><br><br><br><br><br>2 | u(1)\|ae(v)<br><br><br><br><br><br>te(v)\|ae(v)<br><br><br><br><br><br>te(v)\|ae(v)<br><br><br><br><br><br><br>se(v)\|ae(v)<br><br><br><br><br><br><br>se(v)\|ae(v) |

The residual in scalable extension syntax is as follows:

| residual_in_scalable_extension( ) { | C | Descriptor |
|---|---|---|
|   if ( adaptive_prediction_flag && ! BaseDiscardableFlag &&<br>    slice_type != I && slice_type != IE &&<br>    MbPartPredType( mb_type, 0 ) != Intra_16x16 &&<br>    MbPartPredType( mb_type, 0 ) != Intra_8x8 &&<br>    MbPartPredType( mb_type, 0 ) != Intra_4x4 ) {<br>    residual_prediction_flag<br>    if ( residual_prediction_flag && base_mode_flag<br>      smoothed_reference_flag<br>  }<br>  if( !entropy_coding_mode_flag )<br>    residual_block = residual_block_cavlc<br>  else<br>    residual_block = residual_block_cabac<br>  if( MbPartPredMode( mb_type, 0 ) == Intra_16x16 )<br>    residual_block_cabac( Intra16x16DCLevel, 16 )<br>  for( i8x8 = 0; i8x8 < 4; i8x8++ ) /* each luma 8x8 block */<br>    if( !transform_size_8x8_flag )<br>      for( i4x4 = 0; i4x4 < 4; i4x4++ ) { /* each 4x4 sub-block of block */<br>        if( CodedBlockPatternLuma & ( 1 << i8x8 ) )<br>          if( MbPartPredMode( mb_type, 0 ) == Intra_16x16 )<br>            residual_block( Intra16x16ACLevel[i8x8 * 4 + i4x4], 15 )<br>          else<br>            residual_block( LumaLevel[ i8x8 * 4 + i4x4 ], 16 )<br>        else if( MbPartPredMode( mb_type, 0 ) == Intra_16x16 )<br>          for( i = 0; i < 15; i++ )<br>            Intra16x16ACLevel[ i8x8 * 4 + i4x4 ][ i ] = 0<br>        else<br>          for( i = 0; i < 16; i++ )<br>            LumaLevel[ i8x8 * 4 + i4x4 ][ i ] = 0<br>      }<br>    else if( CodedBlockPatternLuma & ( 1 << i8x8 ) )<br>      residual_block( LumaLevel8x8[ i8x8 ], 64 )<br>    else<br>      for( i = 0; i < 64; i++ )<br>        LumaLevel8x8[ i8x8 ][ i ] = 0 | <br><br><br><br><br>3\|4<br><br>3\|4<br><br><br><br><br><br><br>3<br><br><br><br><br><br>3<br><br>3\|4<br><br><br><br><br><br><br><br>3\|4 | <br><br><br><br><br>u(1)\|ae(v)<br><br>u(1)\|ae(v) |

-continued

| | C | Descriptor |
|---|---|---|
| residual_in_scalable_extension( ) { | | |
|   if( chroma_format_idc != 0 ) { | | |
|     NumC8x8 = 4 / ( SubWidthC * SubHeightC ) | | |
|     for( iCbCr = 0; iCbCr < 2; iCbCr++ ) | | |
|       if( CodedBlockPatternChroma & 3 ) /* chroma DC residual present */ | | |
|         residual_block( ChromaDCLevel[ iCbCr ], 4 * NumC8x8 ) | 3\|4 | |
|       else | | |
|         for( i = 0; i < 4 * NumC8x8; i++ ) | | |
|           ChromaDCLevel[ iCbCr ][ i ] = 0 | | |
|     for( iCbCr = 0; iCbCr < 2; iCbCr++ ) | | |
|       for( i8x8 = 0; i8x8 < NumC8x8; i8x8++ ) | | |
|         for( i4x4 = 0; i4x4 < 4; i4x4++ ) | | |
|           if( CodedBlockPatternChroma & 2 ) | | |
|               /* chroma AC residual present */ | | |
|             residual_block( ChromaACLevel[ iCbCr ][ i8x8*4+i4x4 ], | 3\|4 | |
|               15) | | |
|           Else | | |
|             for( i = 0; i < 15; i++ ) | | |
|               ChromaACLevel[ iCbCr ][ i8x8*4+i4x4 ][ i ] = 0 | | |
| } | | |

To address the second problem described above, in terms of both encoding and decoding, the sample or residual values of discardable slices are padded, regardless of whether the discardable slices are available. An example of a padding algorithm that may be utilized with the various embodiments of the present invention involves checking each MB in raster scan order to determine whether the MB is in a discardable slice or not. If it is in a discardable slice, an MB in a discardable slice is considered to be in a non-discardable slice during the padding process. If a left-neighbouring MB is available and in a non-discardable slice, the value of a row of samples in the MB is set to equal the left-neighbouring MB's rightmost sample value from the same row. This process can be referred to as a horizontal padding process. If the left neighbouring MB is not available (i.e., the current MB is at the picture's left boundary) and the upper-neighbouring MB is available and in a non-discardable slice, a vertical padding process is applied, where the value of a column of samples in the MB is set to equal the upper-neighbouring MB's bottom-most sample value from the same column. The horizontal and the vertical padding processes are applicable to both sample and residual signals. If neither the left nor upper-neighboring MB is available as a sample signal, all of the sample values of the MB are set to 128, while all of the residual values of the MB are set to 0 for a residual signal. It should be noted that other padding algorithms may be utilized in conjunction with the various embodiments of the present invention. For example, bottom and right-neighboring MBs can be used for padding as opposed to the left and upper-neighbouring padding process described above.

Alternatively, in addressing the second problem described above, constraints may be applied to the encoding procedure, such that the sample, or residual values of the discardable slices in low layer pictures are not used in the upsampling processes. This requires that MBs in non-discardable slices and that neighbor MBs in discardable slices do not use inter-layer prediction of sample or residual values. In other words, for those MBs in non-discardable slices, the syntax elements intra_base_flag and residual_prediction_flag are both set to 0. This alternative solution to the second problem works when the syntax proposed in JVT-T079 ("Updated results for independent parsing of spatial and CGS layers," 20th JVT Meeting, Klagenfurt, Austria, July 2006, available from http://ftp3.itu.ch/av-arch/jvt-site/2006_07_Klagenfurt/JVT-T079.zip) is included in the SVC draft.

The present invention is described in the general context of method steps, which may be implemented in one embodiment by a program product including computer-executable instructions, such as program code, embodied on a computer-readable medium and executed by computers in networked environments. Examples of computer readable mediums can include various types of storage mediums including, but not limited to, electronic device memory units, random access memory (RAM), read only memory (ROM), compact discs (CDs), digital versatile discs (DVDs) and other internal or external storage devices. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of decoding an encoded video, the method comprising:
   using a processor to perform the steps of:
   extending a boundary of a reference block of a reference layer by padding sample values across the boundary outside the block, the reference block belonging to a non-discardable slice, the boundary of the reference block being with a discardable slice;
   upsampling coded sample values of the reference block by applying filtering, wherein when applying the filtering across the reference block boundary with the discardable slice, filtering is applied at least to padded values; and
   decoding a block of an enhancement layer using prediction with reference to the reference block of the reference layer.

2. A method of encoding a video signal into a scalable bitstream containing an enhancement layer and a reference layer, the method comprising:
   using a processor to perform the steps of:
   upsampling coded samples of a reference block in a picture in the reference layer, the picture in the reference layer containing a discardable slice and a non-discardable slice, the reference block being in the non-discardable slice of the picture in the reference layer, wherein the upsampling process is performed independent of any information from the discardable slice; and
   encoding a block of an enhancement layer using prediction with reference to the upsampled coded samples of the reference block in the reference layer.

3. A method according to claim 2, the method further comprising:
   using a processor to perform the steps of:
   extending a boundary of the reference block of the reference layer by padding sample values across the boundary outside the reference block, the boundary of the reference block being with a discardable slice; and
   wherein the upsampling is performed by applying filtering, and when applying the filtering across the reference block boundary with the discardable slice, filtering is applied at least to padded values.

4. A method according to claim 2, wherein the discardable slices are coded in different slice groups than the non-discardable slices.

5. A computer program product, embodied on a non-transitory computer-readable medium, for decoding an encoded video, comprising:
   computer code for extending a boundary of a reference block of a reference layer by padding sample values across the boundary outside the block, the reference block belonging to a non-discardable slice, the boundary of the reference block being with a discardable slice;
   computer code for upsampling coded sample values of the reference block by applying filtering, wherein when applying the filtering across the reference block boundary with the discardable slice, filtering is applied at least to padded values; and
   computer code for decoding a block of an enhancement layer using prediction with reference to the reference block of the reference layer.

6. A computer program product, embodied on a non-transitory computer-readable medium, for encoding a video signal into a scalable bitstream containing an enhancement layer and a reference layer, comprising:
   computer code for upsampling coded samples of a reference block in a picture in the reference layer, the picture in the reference layer containing a discardable slice and a non-discardable slice, the reference block being in the non-discardable slice of the picture in the reference layer, wherein the upsampling process is performed independent of any information from the discardable slice; and
   computer code for encoding a block of an enhancement layer using prediction with reference to the upsampled coded samples of the reference block in the reference layer.

7. A computer program product according to claim 6, further comprising:
   computer code for extending a boundary of the reference block of the reference layer by padding sample values across the boundary outside the reference block, the boundary of the reference block being with a discardable slice; and
   wherein the upsampling is performed by applying filtering, and when applying the filtering across the reference block boundary with the discardable slice, filtering is applied at least to padded values.

8. A computer program product according to claim 6, wherein the discardable slices are coded in different slice groups than the non-discardable slices.

9. A decoder, comprising:
   a processor; and
   a memory unit operatively connected to the processor and including:
   computer code for extending a boundary of a reference block of a reference layer by padding sample values across the boundary outside the block, the reference block belonging to a non-discardable slice, the boundary of the reference block being with a discardable slice;
   computer code for upsampling coded sample values of the reference block by applying filtering, wherein when applying the filtering across the reference block boundary with the discardable slice, filtering is applied at least to padded values; and
   computer code for decoding a block of an enhancement layer using prediction with reference to the reference block of the reference layer.

* * * * *